(12) United States Patent
Barz et al.

(10) Patent No.: US 8,926,005 B2
(45) Date of Patent: Jan. 6, 2015

(54) VEHICLE BODY STRUCTURE CUT ZONES

(71) Applicant: Zephyros, Inc., Romeo, MI (US)

(72) Inventors: Bill Barz, St. Clair, MI (US); Kenjiro Takahashi, Bloomfield Township, MI (US); Kurt Lilley, Beverly Hills, MI (US)

(73) Assignee: Zephyros, Inc., Romeo, MI (US)

( * ) Notice: Subject to any disclaimer, the term of this patent is extended or adjusted under 35 U.S.C. 154(b) by 0 days.

(21) Appl. No.: 13/900,887

(22) Filed: May 23, 2013

(65) Prior Publication Data

US 2013/0313859 A1 Nov. 28, 2013

Related U.S. Application Data

(60) Provisional application No. 61/651,220, filed on May 24, 2012.

(51) Int. Cl.
*B62D 25/04* (2006.01)
*B62D 29/00* (2006.01)
*B62D 25/02* (2006.01)

(52) U.S. Cl.
CPC ............ *B62D 25/04* (2013.01); *B62D 29/002* (2013.01); *B62D 25/025* (2013.01)
USPC ............ 296/193.06; 296/187.02; 296/203.03

(58) Field of Classification Search
CPC ...... B62D 23/00; B62D 23/005; B62D 25/04; B62D 29/001; B62D 29/002; B62D 29/004; B62D 29/005; B62D 29/048; B62D 27/02; B62D 27/023; B62D 27/026; B62D 27/06
USPC ............ 296/187.02, 187.12, 193.03, 193.05, 296/193.06, 203.01, 203.03, 205, 29, 30
See application file for complete search history.

(56) References Cited

U.S. PATENT DOCUMENTS

| | | | |
|---|---|---|---|
| 5,884,960 A | 3/1999 | Wycech | |
| 5,992,923 A | 11/1999 | Wycech | |
| 6,068,424 A | 5/2000 | Wycech | |
| 6,099,194 A * | 8/2000 | Durand | ........................ 403/270 |
| 6,129,410 A * | 10/2000 | Kosaraju et al. | ......... 296/187.12 |
| 6,168,226 B1 * | 1/2001 | Wycech | ..................... 296/146.6 |
| 6,247,287 B1 * | 6/2001 | Takabatake | ..................... 52/843 |

(Continued)

FOREIGN PATENT DOCUMENTS

| | | | |
|---|---|---|---|
| EP | 2154052 A1 * | 2/2010 | ............. B62D 29/00 |
| EP | 2159109 A1 | 3/2010 | |

(Continued)

OTHER PUBLICATIONS

International Search Report & Written Opinion dated Oct. 1, 2013; Application No. PCT/US2013/042386.

(Continued)

*Primary Examiner* — Gregory Blankenship
(74) *Attorney, Agent, or Firm* — The Dobrusin Law Firm, PC

(57) ABSTRACT

A structural reinforcement for insertion into a cavity of a vehicle structure and method for making the same, the reinforcement including adjacent reinforcing segments and rigid bridges located between adjacent reinforcement segments. The rigid bridges are located for simplified separation of the reinforcement segments post-vehicle crash.

19 Claims, 3 Drawing Sheets

(56) References Cited

U.S. PATENT DOCUMENTS

| | | | |
|---|---|---|---|
| 6,272,809 B1* | 8/2001 | Wycech | 52/847 |
| 6,279,990 B1* | 8/2001 | Miyasaka et al. | 296/203.03 |
| 6,332,643 B1* | 12/2001 | Sukegawa et al. | 296/203.03 |
| 6,348,513 B1 | 2/2002 | Hilborn | |
| 6,368,438 B1 | 4/2002 | Chang et al. | |
| 6,474,726 B1* | 11/2002 | Hanakawa et al. | 296/191 |
| 6,601,910 B1* | 8/2003 | Duggan | 296/203.03 |
| 6,619,727 B1 | 9/2003 | Barz et al. | |
| 6,676,183 B2* | 1/2004 | Yoshida et al. | 296/30 |
| 6,811,884 B2 | 11/2004 | Goodwin et al. | |
| 6,935,681 B2 | 8/2005 | Hasler et al. | |
| 7,118,170 B2* | 10/2006 | Montanvert et al. | 296/209 |
| 7,125,461 B2 | 10/2006 | Czaplicki et al. | |
| 7,249,415 B2 | 7/2007 | Larsen et al. | |
| 7,503,620 B2* | 3/2009 | Brennecke et al. | 296/187.02 |
| 7,673,930 B2 | 3/2010 | Stratman | |
| 7,735,906 B2* | 6/2010 | Takahashi et al. | 296/193.06 |
| 7,913,467 B2 | 3/2011 | Schneider et al. | |
| 8,020,924 B2 | 9/2011 | Niezur et al. | |
| 8,262,152 B2* | 9/2012 | Okumura et al. | 296/193.06 |
| 8,292,354 B2* | 10/2012 | Bodin et al. | 296/193.06 |
| 8,361,589 B2 | 1/2013 | Kraushaar | |
| 8,366,181 B2 | 2/2013 | Belpaire et al. | |
| 8,382,197 B2* | 2/2013 | Eberlein | 296/193.06 |
| 8,388,037 B2 | 3/2013 | LaNore et al. | |
| 8,419,117 B2* | 4/2013 | Stephens | 296/203.03 |
| 8,430,448 B2 | 4/2013 | Richardson et al. | |
| 8,465,088 B2* | 6/2013 | Bodin et al. | 296/193.06 |
| 8,480,163 B2* | 7/2013 | Mori | 296/193.06 |
| 8,491,046 B2* | 7/2013 | Nagai et al. | 296/193.05 |
| 8,511,744 B2* | 8/2013 | Pellmann et al. | 296/193.06 |
| 8,651,562 B2* | 2/2014 | Zornack et al. | 296/193.06 |
| 2003/0164623 A1* | 9/2003 | Yoshida et al. | 296/30 |
| 2004/0078831 A1 | 4/2004 | Dietz et al. | |
| 2004/0130185 A1 | 7/2004 | Hasler et al. | |
| 2004/0256888 A1 | 12/2004 | Le Gall et al. | |
| 2008/0143147 A1* | 6/2008 | Lee | 296/193.06 |
| 2008/0217960 A1* | 9/2008 | Kochert et al. | 296/193.06 |
| 2009/0085379 A1* | 4/2009 | Takahashi et al. | 296/193.06 |
| 2010/0092733 A1 | 4/2010 | Blank et al. | |
| 2010/0117397 A1* | 5/2010 | Richardson et al. | 296/187.02 |
| 2011/0189428 A1 | 8/2011 | Belpaire et al. | |
| 2011/0206890 A1* | 8/2011 | Belpaire et al. | 428/68 |
| 2011/0236610 A1 | 9/2011 | Belpaire et al. | |
| 2011/0236616 A1 | 9/2011 | Belpaire et al. | |
| 2012/0141724 A1 | 6/2012 | Belpaire et al. | |
| 2013/0140851 A1* | 6/2013 | Zornack et al. | 296/193.06 |
| 2013/0181470 A1 | 7/2013 | LaNore et al. | |
| 2013/0187409 A1* | 7/2013 | Moll | 296/193.06 |
| 2013/0313859 A1* | 11/2013 | Barz et al. | 296/193.06 |
| 2014/0049075 A1* | 2/2014 | Kasper et al. | 296/205 |
| 2014/0084633 A1* | 3/2014 | Matsuda et al. | 296/203.01 |

FOREIGN PATENT DOCUMENTS

| | | |
|---|---|---|
| EP | 2159136 A1 | 3/2010 |
| EP | 2289769 | 2/2011 |
| EP | 2401191 A1 | 10/2013 |
| WO | 03/093064 | 11/2003 |
| WO | 2009/080814 | 7/2009 |
| WO | 2010/018190 | 2/2010 |

OTHER PUBLICATIONS

Issued Application No. 6,467,834, Issued on Oct. 22, 2002.
Issued Application No. 7,913,467, Issued Mar. 29, 2011.
Issued Application No. 8,430,448, Issued Apr. 30, 2013.

* cited by examiner

VEHICLE BODY STRUCTURE CUT ZONES

FIELD OF THE INVENTION

The present invention relates generally to reinforcement of structures wherein reinforcement devices are formed having bridge portions inserted in between segments of the reinforcement devices so that the bridge portions facilitate simplified separation of the segments if necessary.

BACKGROUND OF THE INVENTION

Structural reinforcement devices are frequently formed from high strength materials in an effort to meet increasing crash performance requirements. As a result, scenarios where the reinforcement devices must be severed (such as vehicle crash) present a number of challenges given the high strength nature of the reinforcements. In addition, certain types of vehicles including hybrid and electric vehicles require certain precautions during vehicle crashes due to their electrical systems.

Thus, there remains a need for alternative devices that provide the requisite high strength reinforcing capability, while also being formed to allow for easy severing through the reinforcement materials as may be necessary. There is a need for reinforcing inserts that can be cut post-vehicle crash, but also provide sufficient reinforcement to protect vehicle occupants during crash. There is also a need for devices that indicate where hybrid and/or electric vehicles can be safely cut post-vehicle-crash.

SUMMARY OF THE INVENTION

The present invention meets one or more of the above needs by the improved devices and methods described herein.

In one aspect, the present invention pertains to a pillar for an automotive vehicle comprising an elongated continuous outer layer of sheet metal and a plurality of high strength steel reinforcing segments in spaced relationship to each other to define gaps between the segments and being located beneath the outer layer of sheet metal. The pillar may further include an elongated structural reinforcement insert comprising a rigid bridge and a structural foam located on the rigid bridge and bonded to the reinforcing segments, the insert being disposed to bridgingly connect the reinforcing segments. The structure is defined so that it can be readily cut to extricate a vehicle passenger without the need to cut the high strength steel reinforcing segments, while still retaining structural integrity of the pillar for resisting collapse in a crash event.

The pillar as described herein may also be formed such that the reinforcing segments and rigid bridge are connected by a connecter. The rigid bridge may include a connector for bridging connection to one or more reinforcing segments prior to any expansion of the structural foam. The rigid bridge may include one or more metal tabs to which the reinforcing segments can be welded. The rigid bridge may be configured to receive one or more mechanical fasteners that connect the rigid bridge with the reinforcing segments. The rigid bridge may be substantially free of any metallic material. The rigid bridge may include an enlarged cross-section in a gap formed in between two adjacent reinforcing segments. The structural foam may extend into the gap and bond to the outer sheet metal. The rigid bridge may be formed of a polymeric material.

One or more of the reinforcing segments may be a metallic stamping, roll form, hydroform, casting, machined part or extrusion. At least a portion of each of the reinforcing segments has a minimal wall thickness of at least about 0.5 mm. The rigid bridge may substantially entirely enclose at least a portion of one or more reinforcing segments. The rigid bridge portion substantially entirely encloses the entirety of one or more reinforcing segments. The rigid bridge may include one or mere markings to indicate where the rigid bridge should be severed. Adjacent reinforcing segments may be substantially free of any direct contact with one another and are connected only via the rigid bridge. The pillar may be an A-pillar, B-pillar, or C-pillar of a motor vehicle and includes exactly two reinforcing segments and one rigid bridge. The pillar may be a rocker panel and may include exactly two rigid bridges. The rigid bridge may be removably connected to one or more reinforcing portions for simplified replacement. The structural foam may be free of any direct contact with the sheet metal post-expansion.

The present teachings further provide for an elongated polymeric rigid bridge comprising an enlarged central cross-section, a narrowed portion located at each of two ends of the enlarged cross section, a structural foam located on at least a portion of each of the enlarged cross section and narrowed portions and at least two fastening members, each located one of the narrowed portions.

The teachings herein provide for the formation of cut zones within structural reinforcements to allow for easier severing of the reinforcements should any need to cut the reinforcements arise. The out zones may be formed by inserts forming rigid bridge portions, the rigid bridges being formed of materials that are dissimilar from those forming adjacent reinforcing segments. The rigid bridges may be formed of polymeric materials that are more easily severed than the high strength materials.

DETAILED DESCRIPTION

Figure 1:
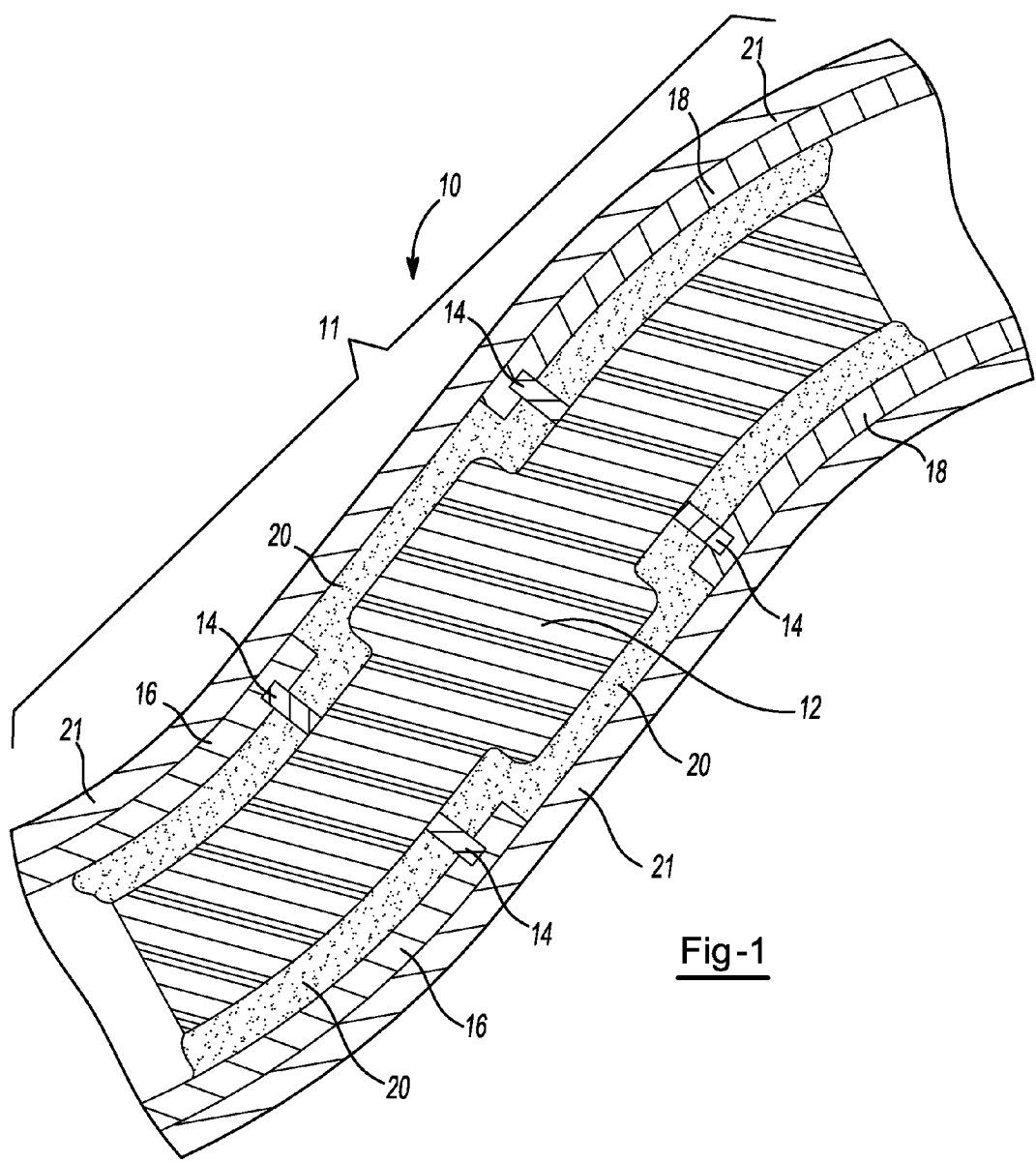
FIG. 1 shows an illustrative cross-section of a vehicle pillar in accordance with the present teachings.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

This application claims the benefit of the filing date of U.S. Provisional Application Ser. No. 61/851,220, filed on May 24, 2012, the contents of which are incorporated by reference herein for all purposes.

The present teachings are directed to the formation of cut zones within structural reinforcements (e.g., reinforcing segments that are connected and/or integrally formed) to allow for easier severing of the reinforcements should any need to cut the reinforcements arise. The cut zones may be formed by materials that are lower in strength than adjacent material forming the reinforcements. More specifically, a reinforcement that would generally be formed of a singular member, may instead be formed by two reinforcing segments with a void therebetween. That void may be filled with a part that connects the two reinforcing segments. The parts for filling the voids may comprise an insert and/or bridge portion formed of polymeric materials that provide sufficient strength in the cut zones but are more easily severed than the materials generally forming the structural reinforcements (e.g., metallic materials including but not limited to steel). The bridge portions may further include a structural foam material located onto at least a portion of the bridge which may expand after installation of the bridge. The bridge portions may be connected with the reinforcing segments so that adjacent reinforcing segments are free of any direct contact with one another. Alternatively, at least a portion of a reinforcement may remain in the void such that the bridge only encompasses a portion of the void and a portion of reinforcement material remains in the void.

In one specific example, pillars and rockers in automotive vehicles are generally formed of high strength metallic materials that are difficult to cut. Each pillar or rocker may be formed of one consistent integrally formed metal section or may be formed of multiple metal sections welded or fastened to one another. Based upon the cutting difficulty, the current teachings are directed toward the integration of rigid bridges in one or more locations along a pillar or rocker. These bridges may be inserted at a location where two or more reinforcing segments would have been directly welded or connected to one another. Alternatively, a reinforcing segment may foe cut prior to installation info a vehicle frame and the bridge inserted between the two remaining reinforcing segments thereby connecting the reinforcing segments. The connected segments may then foe installed into a vehicle frame.

Each bridge may be connected to one or more reinforcing segments. The bridge may be located between two or more adjacent reinforcing segments and may thus prevent direct contact between the two or more reinforcing segments. This lack of direct contact may also result. In a reduction of corrosion over time, given that the metallic materials are no longer in direct contact but are instead connected via a polymeric bridge. In order to connect the bridge to one or more reinforcing segments, each bridge may include one or more fasteners or alternative means for connecting the bridge to one or more reinforcing segments.

The fastener may be a threaded screw fastener or a free-fastener. The fastener may also be provided in a variety of shapes and in a variety of configurations so long as it can secure the bridge to one or more reinforcing segments. Examples of additional suitable fasteners include mechanical fasteners, clips, tabs, press-fits, snap-fits, screws, books, combinations thereof or the like. Furthermore, it is contemplated that the one or more fasteners may be formed integral of a singular material with the material of the bridge or the reinforcing segment or may be formed of a different material and may be removably attached to the bridge and/or reinforcing segment. The fastener may be provided as a magnetic material or an adhesive material that can attach (e.g., adhere or magnetically secure) the bridge to one or more reinforcing segments. The structural foam may have adhesive properties so that the foam assists in adhering the bridge to one or more of the reinforcing segments and/or the sheet metal surrounding the reinforcing segments.

The fastening means may be formed as a weld tab for welding the bridge to one or more reinforcing segments. The weld tab may be formed of a material that is dissimilar to that forming the bridge and may be connected to the bridge via an adhesive or fastener or may be molding into the bridge. The weld tab may be formed of a metallic material for welding directly to one or more reinforcing segments.

In one preferred embodiment, the bridge may be made of a nylon or other polymeric material. The bridge may be injection molded, extruded, die cast, or machined comprising materials such as polysulfone, polyamides (e.g.), nylon, PBI, or PEI. The reinforcing segments may be selected from materials consisting of boron steel aluminum, extruded aluminum, aluminum foam, magnesium, magnesium alloys, molded magnesium alloys, titanium, titanium alloys, molded titanium alloys, polyurethanes, polyurethane composites, low density solid fillers, and formed SMC and BMC.

At least a portion of the bridge may be contacted with one or more structural foam materials or adhesives which may be expandable materials. In a preferred embodiment, the expandable material is an epoxy based material such as those disclosed in U.S. Pat. Nos. 5,884,960; 8,348,513; 8,368,438; 8,811,884; 7,125,461; 7,249,415; and published U.S. Application No. 20040078831, hereby incorporated by reference. The structural foam material may be located onto the bridge prior to inserting the bridge into a void between two or more segments. The structural foam may be located on one or more segments prior to insertion of the bridge prior to insertion of the bridge between adjacent segments. The structural foam may expand to contact any adjacent surface which may include one or more of the segments and/or any surface along the exterior of a cavity which receives the bridge and segments (which may be a sheet metal layer).

One or more of the reinforcing segments may be insert-molded within the bridge portion such that a reinforcing segment is inserted info a location and molten material of the bridge portion is applied over and around the second reinforcing portion. In another preferred embodiment, one or more reinforcing segments may be co-extruded with the bridge portion material and/or the structural foam material. The reinforcing segments may also be attached to the bridge portion via a fastening means or adhesive, such fasteners or adhesive being applied to the bridge (or even applied to a reinforcing segment) via any of the methods described above. The structural foam material may also be applied to one or more of the bridge and/or reinforcing segments via any of the methods described above.

Adjacent reinforcing segments may be formed of different materials. More specifically, adjacent reinforcing segments may be formed of different metallic materials. Thus, the bridge may connect two different reinforcing segments where a first reinforcing segment is formed of a higher strength material and a second reinforcing segment is formed of a lower strength material. The material of the second reinforcing segment may be selected so that the tensile strength and modulus of the second reinforcing segment is lower than that of the first reinforcing portion. The tensile strength of the first reinforcing segment material may be at least about 1.2 times the tensile strength of the second reinforcing segment material. More preferably, the tensile strength of the first reinforcing segment material is at least about 2 times that of the second reinforcing segment material, or even 5 times that of the second reinforcing segment material.

As shown, for example in FIG. 1, a vehicle pillar 10 includes an insert comprising a rigid bridge 12. The rigid bridge is connected via fasteners 14 to a first reinforcing segment 18 and a second reinforcing segment 18. The rigid bridge includes a layer of structural foam 20 located onto at least a portion of the bridge. The foam is shown post-expansion. A layer of sheet metal 21 lies adjacent each reinforcing segment so that the foam 20 expands to contact the sheet metal.

Figure 2:
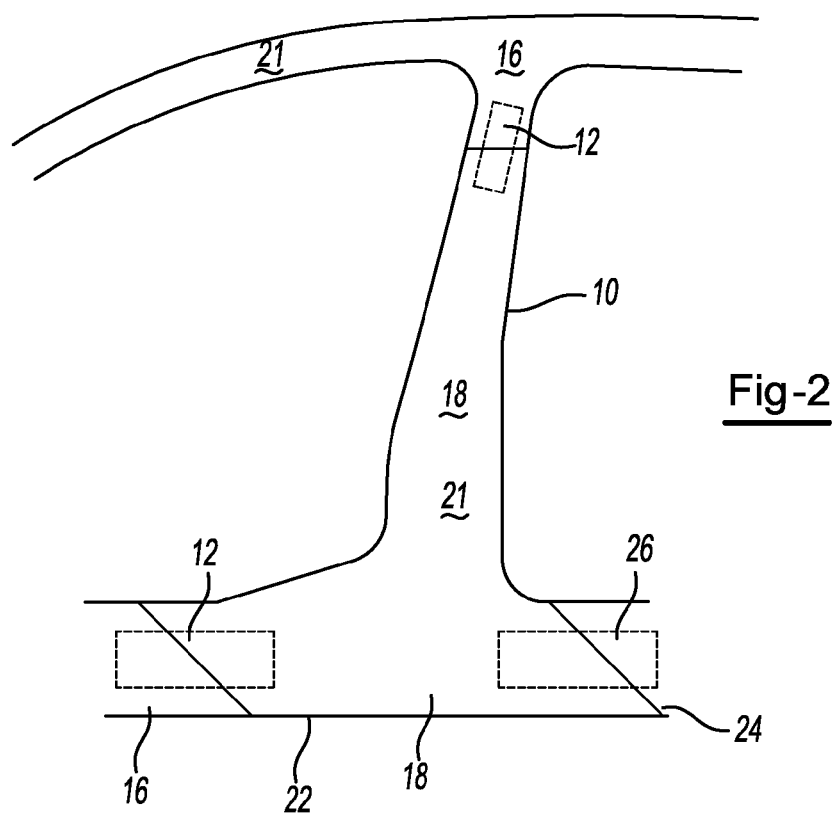
FIG. 2 shows an illustrative side profile view of the exterior of a vehicle pillar and rocker panel in accordance with the present teachings.

FIG. 2 shows an exemplary vehicle-pillar 10 and vehicle rocker 22. The exterior of the pillar and rocker are shown. The pillar includes a first reinforcing segment 16 and a second reinforcing segment 18 (both located beneath a sheet metal layer 21). A rigid bridge 12 (shown in dotted lines beneath the sheet metal layer 21) is inserted in between the first and second reinforcing segments. The vehicle rocker 22 includes a first reinforcing segment 16, a second reinforcing segment 18, and a third reinforcing segment 24 (located beneath the sheet metal layer 21). The rocker also includes a first rigid bridge 12 and a second rigid bridge 28 (shown in dotted lines beneath the sheet metal layer 21).

Figure 3:
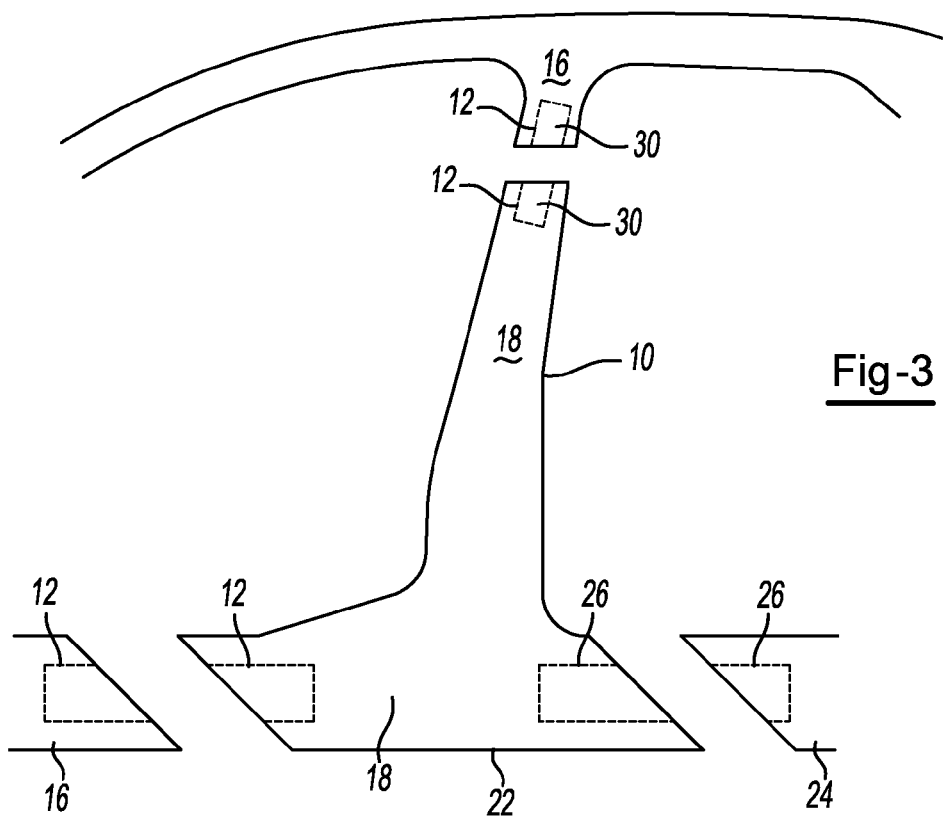
FIG. 3 shows a side profile view of the exterior of the vehicle pillar and rocker panel of FIG. 2 post-cutting.

FIG. 3 shows the vehicle pillar 10 and rocker 22 of FIG. 2 post severing. The first and second reinforcing segments 16, 18 and the rigid bridge 12 of the pillar are connected prior to severing, but the rigid bridge 12 is cut during the severing process so that the first and second reinforcing segments are no longer connected and the bridge is cut into at least a first bridge portion 30 and a second bridge portion 32. The bridge 12 is located so that in the event that the pillar must be severed, the bridge 12 is cut as opposed to the first or second reinforcing segments 16, 18. The rocker includes a first and second rigid bridge 12, 26 that are both shown as cut, thereby disconnecting the first reinforcing segment 18 and second reinforcing segment 18, and also the second reinforcement segment 18 and third reinforcement segment 24.

Figure 4:
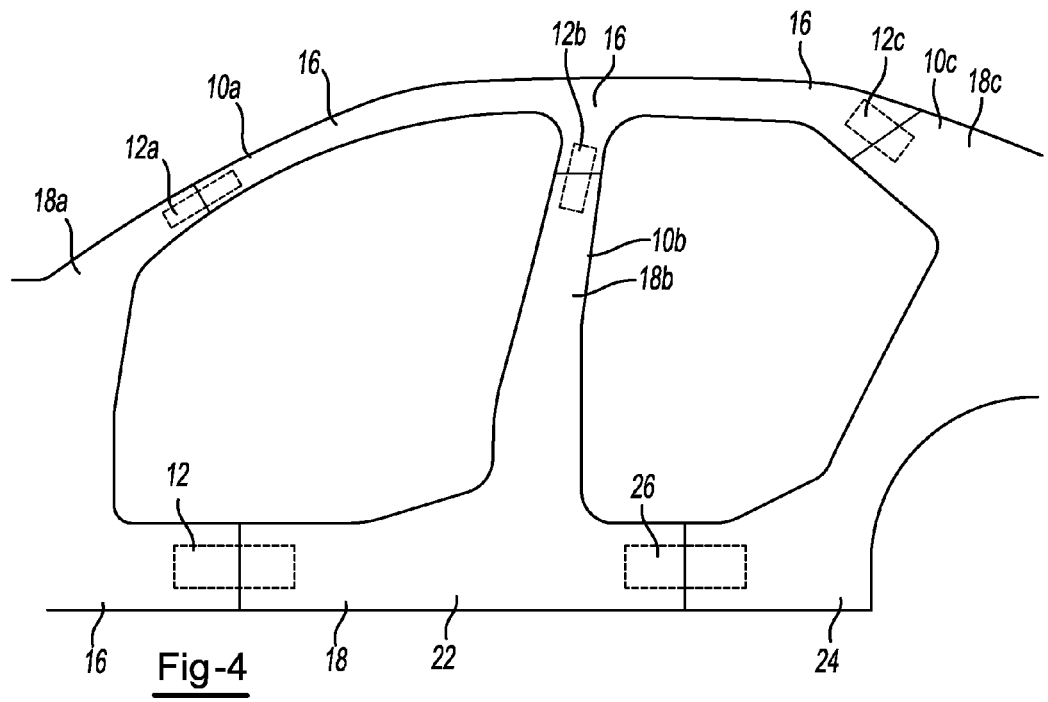
FIG. 4 shows an illustrative side profile view of a vehicle A-pillar, B-pillar, C-pillar and rocker panel in accordance with the present teachings.

FIG. 4 shows a vehicle A-pillar 10a, B-pillar 10b, C-pillar 10c and rocker 22 of a vehicle prior to severing. The A-pillar, B-pillar and C-pillar each share a first reinforcing segment 16 and each includes a respective second reinforcing segment 18a-c. Each of the A-pillar, B-pillar and C-pillar also include a rigid bridge 12a-c. The rocker 22 includes a first, second and third reinforcing segment 16, 18, 24 and a first and second bridge 12, 28.

Figure 5:
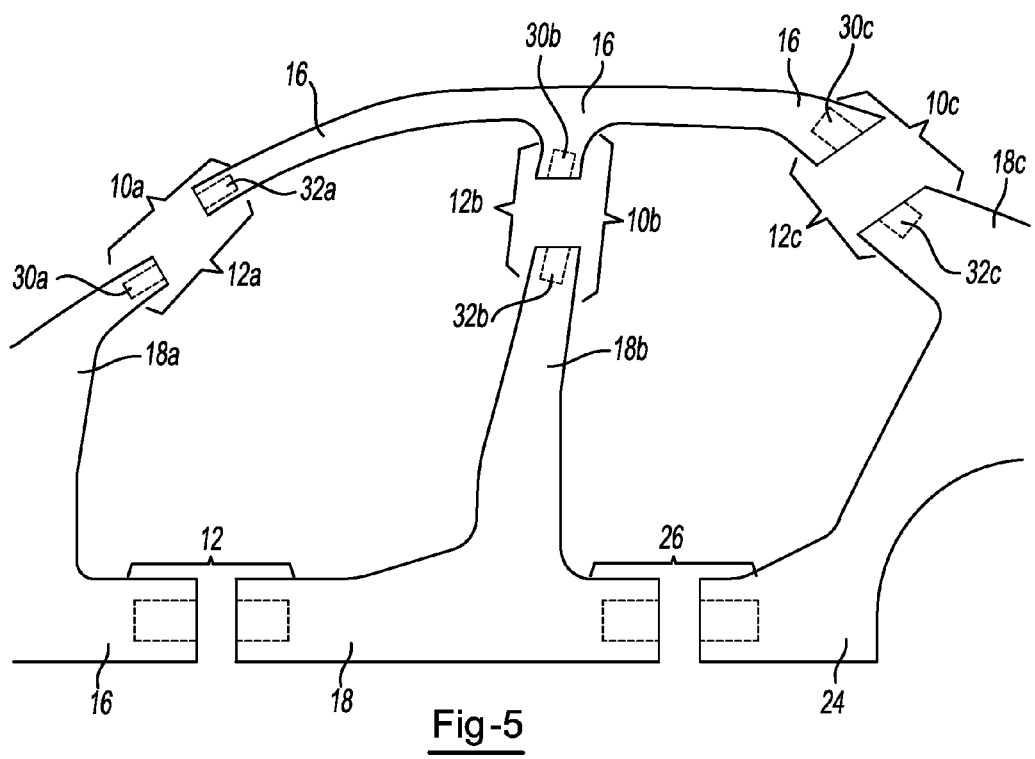
FIG. 5 shows a side profile view of the exterior of the vehicle pillars and rocker panel of FIG. 4 post-cutting.

FIG. 5 the vehicle pillars 10a, 10b, 10c and rocker 22 of FIG. 4 post severing. The first reinforcing segment 16 and each second reinforcing segment of each pillar 18a, 18b and 18c are connected via respective bridges 12a, 12b and 12c prior to severing. The rigid bridges 12a, 12b, 12c are shown as cut during the severing process so that the first and second reinforcing segments are no longer connected and each bridge is cut info at least a first bridge portion 30a-c and a second bridge portion 32a-c. The bridges 12a, 12b, 12c are located so that in the event that the pillar must be severed, one or more of the bridges are cut as opposed to the first or second reinforcing segments 16, 18a-c. The rocker includes a first and second rigid bridge 12, 28 that are both shown as out, thereby disconnecting the first reinforcing segment 16 and second reinforcing segment 18, and also the second reinforcement segment 18 and third reinforcement segment 24.

While the examples show in the drawings are directed toward vehicle pillar and rocker embodiments, it should be recognized that the bridge inserts described herein may be utilized in any location where reinforcement is desired and/or connection between adjacent parts is required. The bridges may be formed such that each end connects to one of two or more adjacent segments. The bridges may engage one or more segments in a friction fit arrangement. The bridges may have any shape suitable for connecting two parts or segments, whether the parts are co-planar or located in differing planes. The bridges may located substantially within an interior cavity of one or more adjacent segments such that only a small portion of the bridge is visible between the two segments. The bridge may merely provide additional support for a part having a thin cross-section along part of its length, such that the bridge is not connecting to separate segments but rather supports a singular segment.

The shape of the bridge is generally dictated by the shape and arrangement of the segments which are connected by the bridge. The bridge may be an elongated insert, a generally square or rounded insert, or any insert capable of connecting two or more parts (e.g., segments). The cross-section shape of the bridge may be variable so that, at least a portion of the bridge extends outward to contact an exterior layer of a cavity along any portion of the bridge not encompassed within a segment (e.g., any portion of the bridge where a segment is not located).

Unless stated otherwise, dimensions and geometries of the various structures depicted herein are not intended to be restrictive of the invention, and other dimensions or geometries are possible. Plural structural components can foe provided by a single integrated structure. Alternatively, a single integrated structure might be divided into separate plural components. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention.

The preferred embodiment of the present invention has been disclosed. A person of ordinary skill in the art would realize however, that certain modifications would come within the teachings of this invention. Therefore, the following claims should be studied to determine the true scope and content of the invention.

The explanations and illustrations, presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of toe invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. Other combinations, are also possible as will be gleaned from the following claims, which are also hereby incorporated by reference into this written description.

What is claimed is:
1. A pillar for an automotive vehicle comprising:
an elongated continuous outer layer of sheet metal;
a plurality of high strength steel reinforcing segments in spaced relationship to each other to define gaps between the segments and being located beneath the outer layer of sheet metal;

an elongated structural reinforcement insert comprising a rigid bridge and a structural foam located on the rigid bridge and bonded to the reinforcing segments, the insert being disposed to bridgingly connect the reinforcing segments;

wherein a structure is defined that can be readily cut to extricate a vehicle passenger without the need to cut the high strength steel reinforcing segments, while still retaining structural integrity of the pillar for resisting collapse in a crash event.

2. The pillar of claim 1, wherein the reinforcing segments and rigid bridge are connected by a connector.

3. The pillar of claim 1, wherein the rigid bridge includes a connector for bridging connection to one or more reinforcing segments prior to any expansion of the structural foam.

4. The pillar of claim 1, wherein the rigid bridge includes one or more metal tabs to which the reinforcing segments can be welded.

5. The pillar of claim 1, wherein the rigid bridge is configured to receive one or more mechanical fasteners that connect the rigid bridge with the reinforcing segments.

6. The pillar of claim 1, wherein the rigid bridge is substantially free of any metallic material.

7. The pillar of claim 1, wherein the rigid bridge includes an enlarged cross-section in a gap formed in between two adjacent reinforcing segments.

8. The pillar of claim 7, wherein the structural foam extends into the gap and bonds to the outer sheet metal.

9. The pillar of claim 1, wherein the rigid bridge is formed of a polymeric material.

10. The pillar of claim 1, wherein one or more of the reinforcing segments is a metallic stamping, roll form, hydroform, casting, machined part or extrusion.

11. The pillar of claim 1, wherein at least a portion of each of the reinforcing segments has a minimal wall thickness of at least about 0.5 mm.

12. The pillar of claim 1, wherein the rigid bridge portion substantially entirely encloses at least a portion of one or more reinforcing segments.

13. The pillar of claim 1, wherein the rigid bridge portion substantially entirely encloses the entirety of one or more reinforcing segments.

14. The pillar of claim 1, wherein the rigid bridge includes one or more markings to indicate where the rigid bridge should be severed.

15. The pillar of claim 1, wherein adjacent reinforcing segments are substantially free of any direct contact with one another and are connected only via the rigid bridge.

16. The pillar of claim 1, wherein the pillar is an A-pillar, B-pillar, or C-pillar of a motor vehicle and includes exactly two reinforcing segments and one rigid bridge.

17. The pillar of claim 1, wherein the pillar is a rocker panel and includes exactly two rigid bridges.

18. The pillar of claim 1, wherein the rigid bridge is removably connected to one or more reinforcing portions for simplified replacement.

19. The pillar of claim 1, wherein the structural foam is free of any direct contact with the sheet metal post-expansion.

* * * * *